H. E. HOWARD & J. T. TITSWORTH.
FURROWING MACHINE.
APPLICATION FILED APR. 15, 1918.

1,276,531.

Patented Aug. 20, 1918.

Inventors
Horace E. Howard,
John T. Titsworth,
by Hazard & Miller
Att'ys.

UNITED STATES PATENT OFFICE.

HORACE E. HOWARD AND JOHN T. TITSWORTH, OF SAN DIMAS, CALIFORNIA.

FURROWING-MACHINE.

1,276,531.     Specification of Letters Patent.     Patented Aug. 20, 1918.

Application filed April 15, 1918. Serial No. 228,797.

*To all whom it may concern:*

Be it known that we, HORACE E. HOWARD and JOHN T. TITSWORTH, citizens of the United States, residing at San Dimas, in the county of Los Angeles and State of California, have invented new and useful Improvements in Furrowing - Machines, of which the following is a specification.

Our object is to make an expansible and contractible furrowing machine especially for use in irrigation work and my invention consists of the novel features herein shown, described and claimed.

Figure 1:
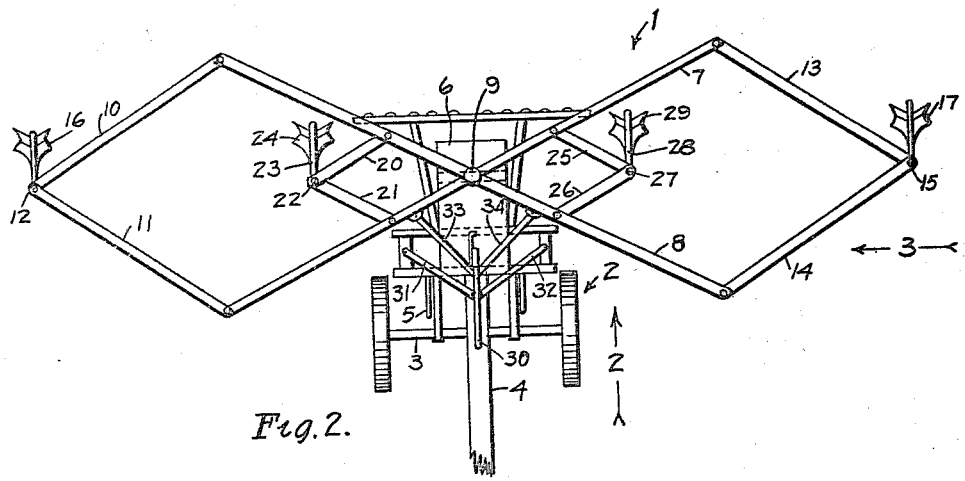
Figure 1 is a top plan view of a furrowing machine embodying the principles of my invention.
Figure 2:
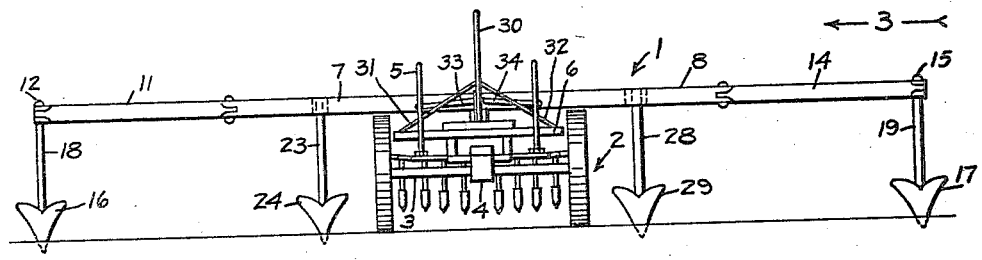
Fig. 2 is a front elevation as indicated by the arrow 2 in Figs. 1 and 3.
Figure 3:
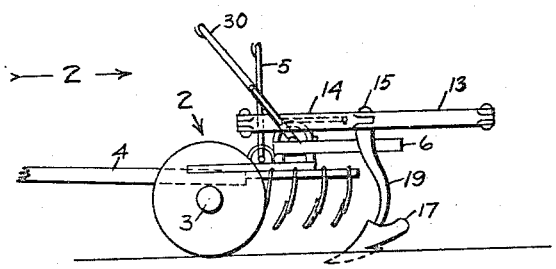
Fig. 3 is a side elevation as indicated by the arrows 3 in Figs. 1 and 2.

The furrowing machine 1 is adapted to be mounted on the cultivator 2. The cultivator 2 has an axle 3 pivotally connected to the tongue 4 the angle of the axle 3 relative to the tongue being controlled by the hand lever 5, so as to raise or lower the platform 6 by manipulating the hand lever 5.

The lazy tong bars 7 and 8 are crossed at the center of the platform 6 and rest in horizontal positions upon the platform said bars being held together and held to the platform by a pivot bolt 9. The lazy tong bars 10 and 11 extend outwardly from corresponding ends of the bars 7 and 8 and are connected together by a pivot 12. The lazy tong bars 13 and 14 extending outwardly from the other end of the bars 7 and 8 and are connected together by the pivot 15. The furrowing shovels 16 and 17 are fixed upon the lower ends of the beams 18 and 19, and the upper ends of these beams are connected to the pivots 12 and 15. The intermediate lazy tong bars 20 and 21 are pivotally connected to the bars 7 and 8 at one side of the pivot 9 and are connected together by pivot 22. A beam 23 is connected to the pivot 22 and a shovel 24 is connected to the lower end of the beam. The second pair of intermediate lazy tong bars 25 and 26 are connected to the bars 7 and 8 on the other side of the pivot 9 from the bars 20 and 21, and said bars 25 and 26 are connected together by a pivot 27. The beam 28 is connected to the pivot 27 and the shovel 29 is connected to the beam 28. A hand lever 30 is connected at its lower end to the platform 6. Braces 31 and 32 connect the lever to the frame of the cultivator and links 33 and 34 connect the hand lever 30 to the bars 7 and 8, so that by manipulating the hand lever 30 the lazy tong construction is operated to move the shovels 16, 17, 24 and 29 to and from each other as required to vary the width between the furrows made by the shovels.

Various changes may be made without departing from the spirit of our invention, as claimed.

We claim:

1. The combination with a cultivator of a lazy tong frame mounted horizontally crosswise of the cultivator, furrow shovels carried by the lazy tong frame in a transverse line and means for operating the lazy tong frame to move the shovels to and from each other.

2. The combination of a cultivator having a horizontal platform, of a lazy tong frame pivotally mounted upon the platform and extending laterally both ways, furrow shovels carried by the lazy tong frame in a transverse line, a hand lever mounted upon the cultivator and links connecting the hand levers to the lazy tong frame so that by manipulating the hand lever the lazy tong levers may be operated to move the furrow shovels to and from each other.

In testimony whereof we have signed our names to this specification.

HORACE E. HOWARD.
JOHN T. TITSWORTH.

Copies of this patent may be obtained for five cents each, by addressing the "Commissioner of Patents, Washington, D. C."